(12) United States Patent
Franco et al.

(10) Patent No.: US 8,024,330 B1
(45) Date of Patent: Sep. 20, 2011

(54) COLLABORATIVE INCIDENT ALERT SYSTEM FOR MOBILE DEVICES

(76) Inventors: Hector Franco, Sunnyvale, CA (US); Alexander Franco, Herndon, VA (US)

( * ) Notice: Subject to any disclaimer, the term of this patent is extended or adjusted under 35 U.S.C. 154(b) by 1652 days.

(21) Appl. No.: 11/133,829

(22) Filed: May 20, 2005

Related U.S. Application Data

(60) Provisional application No. 60/573,398, filed on May 20, 2004.

(51) Int. Cl.
*G06F 7/00* (2006.01)
*G06F 17/30* (2006.01)

(52) U.S. Cl. .......................................... 707/724; 707/725

(58) Field of Classification Search .................. 707/724, 707/725, 999.003
See application file for complete search history.

(56) References Cited

U.S. PATENT DOCUMENTS

| | | | |
|---|---|---|---|
| 6,577,946 B2 * | 6/2003 | Myr | 701/117 |
| 6,615,130 B2 * | 9/2003 | Myr | 701/117 |
| 6,862,524 B1 * | 3/2005 | Nagda et al. | 701/209 |
| 6,882,837 B2 * | 4/2005 | Fernandez et al. | 455/404.1 |
| 6,885,874 B2 | 4/2005 | Grube et al. | |
| 7,098,787 B2 * | 8/2006 | Miller | 340/539.18 |
| 2009/0067586 A1 | 3/2009 | Fano et al. | |

FOREIGN PATENT DOCUMENTS

WO   WO 00/22593   4/2000

* cited by examiner

*Primary Examiner* — Hosain T Alam
*Assistant Examiner* — Van H Oberly

(57) ABSTRACT

An incident alert system enables a plurality of users to participate in a collaborative process to report and be alerted of incidents such as emergencies or hazards. A user uses a networked mobile phone with geo-positioning capability to communicate with a server to report incidents and to inquire about potential incidents of interest based on the user's current geographic position. Reports of incidents are transmitted to the server accompanied by the current position of the user/mobile phone. A user's mobile phone is preferably configured to automatically submit periodic inquiries to the server based on the user's location. Upon receipt of an inquiry from a user, the system queries a database to identify reports of potential interest to the inquiring user. The system analyzes the reports to determine whether to alert the inquiring user of a potential incident of interest.

33 Claims, 6 Drawing Sheets

COLLABORATIVE INCIDENT ALERT SYSTEM FOR MOBILE DEVICES

RELATED APPLICATIONS

This application claims the benefit of U.S. Provisional Application No. 60/573,398, filed on May 20, 2004 and titled "MOBILE EMERGENCY COLLABORATIVE ALERT AND RESPONSE SYSTEM," which is hereby incorporated by reference.

FIELD OF THE INVENTION

This invention relates generally to a system for mobile phone users to collaboratively report and be alerted of emergencies or hazards and to have the opportunity to respond and assist when possible. More particularly, the invention relates to a collaborative system that allows users of Internet-enabled mobile phones equipped with global positioning technology to communicate with a server to report and receive emergency and hazard information. The system can also be configured to coordinate users to provide the fastest possible assistance in emergency situations.

BACKGROUND OF THE INVENTION

Mobile phones are becoming an integral part of every day life for most citizens in the US and other countries. At the same time, Third Generation (3G) wireless technologies and competition are rapidly expanding the features and capabilities offered by these devices to include wireless Internet access, Global Positioning System (GPS), picture transmission and video transmission. Mobile phones can also provide a speed dial for emergency calls to 911. Current systems, however, do not offer the capability for a plurality of users to collaborate to identify an emergency or hazard situation and to alert other users in the same geographic area to give them the opportunity to provide assistance for the emergency or to avoid the identified hazard.

The present invention seeks to address the aforementioned limitations in the prior technology in addition to providing previously unavailable advantages and conveniences.

SUMMARY OF THE INVENTION

An incident alert system enables a plurality of users to participate in a collaborative process whereby they can report, be alerted of, and respond to or avoid incidents such as emergencies or hazards. A user uses a networked mobile device with geo-positioning capability, such as a mobile phone, to communicate with a server to report incidents, such as emergencies or hazards, and to inquire about potential incidents of interest based on the user's current geographic position. By facilitating information sharing based on users' geographic locations, the alert system significantly opens the opportunities for individuals to be Good Samaritans by informing others of hazards or by responding to urgent requests for assistance by others in need.

Hazards are preferably any incident about which users might want to share information with other users. Hazards can include, for example, road conditions (such as ice, snow, police activity or traffic) or weather conditions (such as thunderstorms or tornados) that users may want to avoid. Emergencies are preferably incidents that involve a need of immediate assistance and can include, for example, health conditions (such as heart attacks or critical injuries) or crimes in progress (e.g. rape, abduction or robbery). An alert of an emergency that is sent to a user is preferably accompanied by a request for assistance. The user receiving the emergency alert can be given the opportunity respond to the system indicating that he will assist.

In order to report an incident, a software program can display a selection menu in the mobile phone listing predefined types of incidents. A user's selection made from this menu is transmitted to the server accompanied by the current position of the user/mobile phone. The server then gathers reports of incidents sent by users of the system in a reports database.

A user's mobile phone is preferably configured to automatically submit periodic inquiries to the server. Upon receipt of an inquiry from a user, the system queries the reports database to identify reports of potential interest to the inquiring user. To provide criteria by which the server can query the database to identify reports of potential interest, a zone of interest can be specified for each user. The user's zone of interest can be expressed as a set of database query parameters defining which reports of emergencies or hazards may be of interest to the user. These parameters can be simple, such as a radius of 5 miles or a 10 minute drive from the current location of the user, or can involve complex conditions that need to be met. These parameters can also take into account what types of incidents the user wants to be informed of (e.g. inform of tornados but not thunderstorms). Preferably, the system provides an interface, such as a web site, that allows each user to specify certain preferences based upon which the parameters of the user's zone of interest are determined.

The system analyzes the reports received from the reports database to determine whether to alert the inquiring user of a potential incident of interest to the user. In one embodiment, the analysis includes a comparison of the number of reports produced by the query to a threshold number of reports required in order to alert the user. In another embodiment, the analysis of the reports can take into consideration, for example, the amount of time elapsed since each report and/or the distance between the reporting user and the inquiring user in determining whether to alert the inquiring user of the incident.

In one embodiment of this invention, the system maintains a database of individual incidents that have been identified. This incident database is preferably maintained in addition to or instead of the database of incident reports. The incidents recorded in the incident database are preferably indicative of actual or confirmed incidents as opposed to the reports in the reports database, which may not have been confirmed, and which may include multiple reports for any single incident. The incident database can be populated using many techniques. In one technique, a representative from a "911" emergency call center can enter a record of an incident into the incident database. A representative of a weather service can manually enter a record relating to a critical atmospheric event—such as a tornado or thunderstorm. In another technique, reports of incidents by users of the system can be analyzed and/or processed to identify individual incidents, which can then be entered into the incident database. This analysis or processing can be performed by human or automatically and it preferably takes into consideration whether two or more reports of an incident relate to the same actual incident. In another technique, all reports of incidents of certain types (e.g. rape, robbery, or tornado) are entered into the incident database as separate incidents. Preferably, a time and geographic location are logged for each incident. Incidents in the incident database are preferably removed or closed after the passage of time or after the receipt of some indication that the incident has been resolved or no longer exists.

When a user submits an inquiry, the incident database can be queried using the user's zone of interest in the same manner as described above with respect to the reports database. Incidents that fall within the user's zone of interest (e.g. based on time and geographic location of the incident) are reported to the inquiring user. Certain types of incidents (e.g. hurricanes, thunderstorms, tsunamis) can be entered into the incident database to cover a geographic area, rather than just a point. To account for these cases, the database query can be configured to further identify incidents where the geographic coverage of the incident intersects with the geographic scope of the inquiring user's zone of interest.

In accordance with one embodiment, the system keeps track of the latest transmitted position (and optionally a predicted current position) of a user based on one or more of the user's prior inquiries. This information can be stored in a user position database. Once a new emergency or hazard is identified, the system can query the user position database to identify users who may want to be informed of this incident and/or who may be able to assist in an emergency. In this manner, in time-critical situations, the system can communicate a message (e.g. by text message or telephone call) to the mobile phone of a user in advance of the user's submitting an inquiry.

Further aspects of this invention will become apparent in the Detailed Description, which contains the following Sections:
I. Overview and System Components
II. Incident Report Handling Process
III. Report-Based Alert Process
IV. Emergency Identification and Handling Process
V. Incident-Based Alert Process
VI. Conclusion

DETAILED DESCRIPTION OF THE INVENTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

I. Overview and System Components

Figure 1:
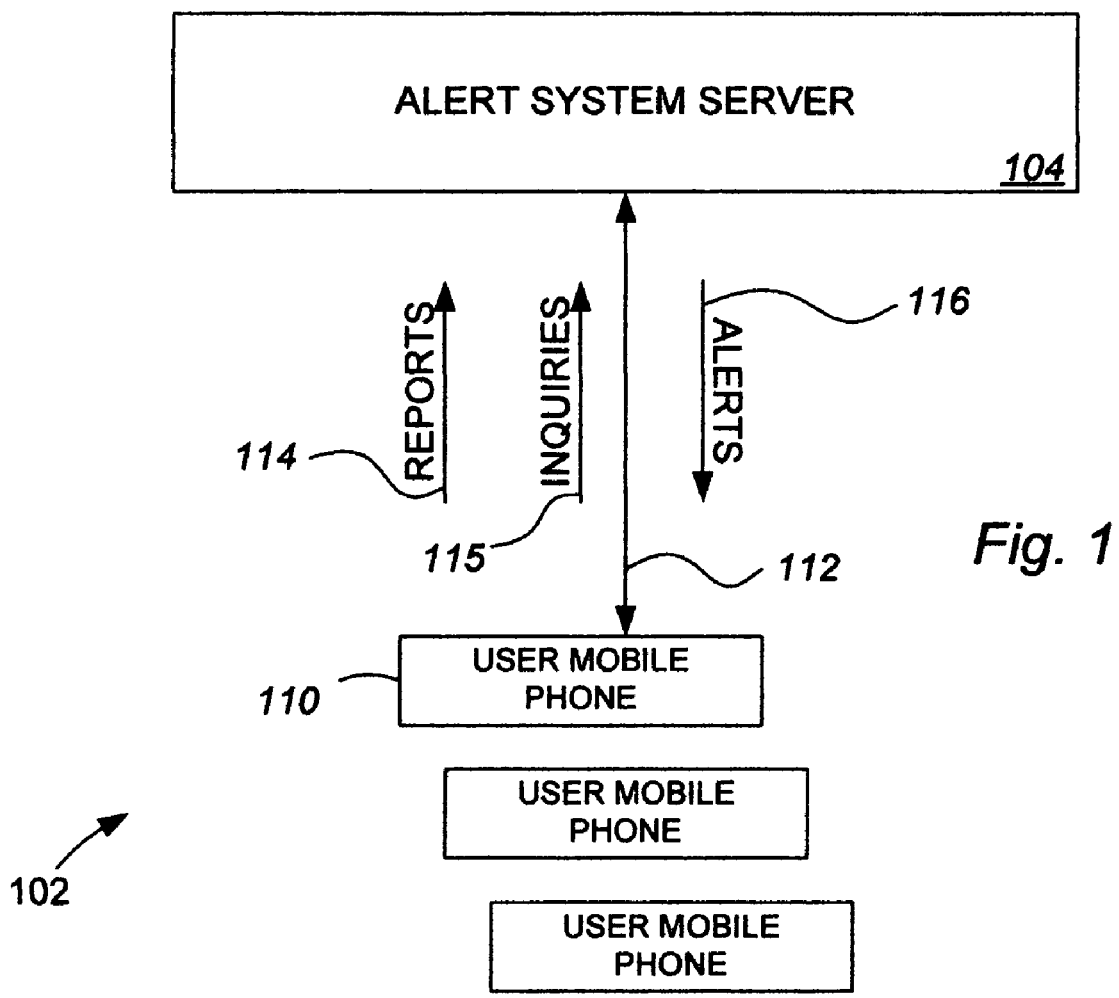
FIG. 1 is an overview illustration of an alert system in accordance with in one embodiment of the invention.

As shown in FIG. 1, an alert system 102 includes a server 104 that receives reports 114 from and responds to inquiries 115 from a plurality of users' networked mobile phones 110. The reports and inquiries preferably relate to incidents such as emergencies or hazards which may be of interest to users of the system. Incidents can be any situation or condition of which users of the system might want to be informed. Hazards can include, for example, road conditions (such as ice, snow, police activity or traffic) or weather conditions (such as thunderstorms or tornados) that users may want to avoid. Emergencies are preferably incidents that involve a need of immediate assistance and can include, for example, health conditions (such as heart attacks or critical injuries) or crimes in progress (e.g. rape, abduction or robbery). An incident could also be a general request for assistance by a user in distress (e.g. request for assistance due to an automobile breakdown).

The mobile phones 110 preferably include geo-positioning capability such as GPS and connectivity to a communications network, such as the Internet via, for example, a wireless Internet communication link 112. It will be understood that although the present description refers to mobile phones 110, any networked mobile communication device can be used. Geo-positioning capability can be provided in-part or wholly through a communications network that supports a mobile phone. For example, proximity to mobile phone towers based on signal strength, signal delay, and triangulation techniques can be used to locate a user. Indeed, any techniques, such as those proposed and implemented to comply with the U.S. Federal Communications Commission's e911 initiative, can be used for geo-location purposes in accordance with the present invention.

In order to report an incident, a user uses his mobile phone 110 to transmit a report 114 of the incident, preferably accompanied by the current position of the user/mobile phone, to the server 104 through the communication link 112. The server gathers reports of incidents sent by users of the system in a reports database as will be discussed below.

To facilitate a user's reporting of an incident using the phone 110, a software program can display a selection menu on the mobile phone listing predefined types of incidents. A user's selection made from this menu is then transmitted to the server 104. The predefined types of incidents can include, for example, various types of hazards, emergencies, or general (non-emergency) requests for assistance.

Inquiries are preferably performed automatically by each user's activated mobile phone. The phone preferably sends periodic inquiries to the alert system 102 through the communication link 112 to find out if there is any incident which may be of interest to the user. In response to inquiries, the server 104 transmits incident alerts 116 to the mobile phones 110 of those users that may be interested in an incident through the communication link 112. An alert transmitted by the server 104 preferably includes the nature or type of the incident and optionally its location. An alert of an emergency that is sent to a user can also be accompanied by a request that the receiving user assist in the emergency (e.g. as a Good Samaritan).

Upon receipt of an inquiry from a user, the system queries a database to identify incidents (or incident reports) of potential interest to the inquiring user. To provide criteria by which the server can query a database, a zone of interest is preferably specified for each user. A user's zone of interest is a zone within which reports or occurrences of incidents or hazards may be of interest to the user.

A user's zone of interest can be expressed as a set of database query parameters defining which incidents may be of interest to the user and based upon which a database is queried for reports of potential interest to the user. For example, a user's zone of interest can be a geographic area and time range referenced to the current geographic position of the user and the current time. The extent of the geographic area (or range) can be, for example, a circular area centered on the user's present location. The radius of the area can be expressed, for example, by a unit of length (e.g., within 5 kilometer) or by the time to cover the geographic distance (e.g. within 5 minutes drive). The extent of the time range can be, for example, a time segment starting a number of minutes prior to the current time (e.g. within the past 15 minutes) and extending to the present time. The number of minutes can be selected by the user or by the system, optionally based on user preferences. The geographic area and time ranges are combined in a database query to retrieve all reports falling within both the geographic area and time ranges.

A zone of interest can be defined to include requirements in addition to or instead of geographic area and time. For example a zone of interest can be configured to include only reports of incidents of a certain type (e.g. traffic hazards). Further, it may be the case that a user doesn't want to be alerted of certain types of incidents or that the user is unable or unwilling to assist in certain types of emergencies. In these cases, the user's zone of interest for these types of incidents can be set to return a null set from a database query or to skip the database query altogether.

A zone of interest may also be defined dynamically, on-the-fly, possibly based on contextual factors relating to the user's present environment. For example, a geographic area of a user's zone of interest can be adjusted dynamically to expand as the user moves from a more densely populated area to a less densely populated area. In one embodiment, a zone of interest for a user traveling along a highway can be configured to include a narrow geographic band covering the highway ahead of the user. In one embodiment, a zone of interest can be dynamically adjusted (e.g. by expanding or contracting time segment or geographic area) so that the zone would cover a relatively constant number of prior inquiries from other users. In this manner, the number of "eyes" watching for incidents of interest to a user is maintained at a relatively constant level within the user's zone of interest.

A user and/or the system may define more than one zone of interest for each user where each zone of interest is associated with a different type of incident. For example, a user may define a zone of interest for traffic conditions whereby the distance is 15 miles from the position of the inquiry and the time segment is the 30 minute segment preceding the time of inquiry. Alternatively, a user may also define a zone of interest for providing assistance in response to an emergency. For example, a medical doctor may define a zone of interest for providing assistance in identified emergencies within a 10 minute drive from the doctor's current location.

In one embodiment, velocity and direction of travel of each reporting user can be stored in the reports and inquiries database 202. In this configuration, a user's zone of interest can be further defined to include only reports received from users with a similar velocity and direction of travel. Additional analysis can be performed using map data to configure a zone of interest to include only reports from users traveling on the same road as the inquiring user. The zone of interest in this case can also be configured to include only reports received from users traveling in the same direction as the inquiring user.

Figure 2:
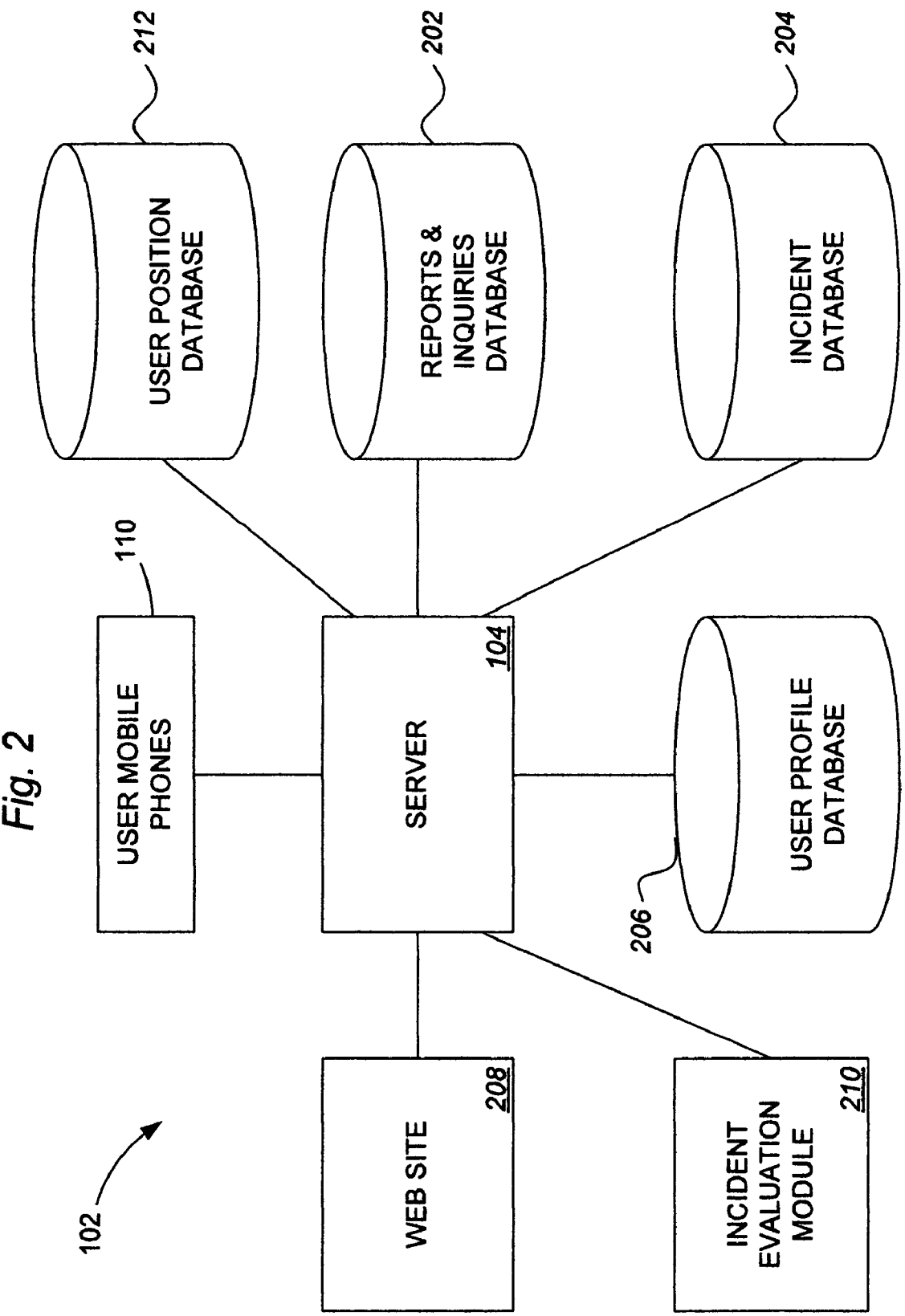
FIG. 2 shows a functional block diagram of one embodiment of the alert system.

FIG. 2 shows a block diagram in accordance with one embodiment of the alert system 102. The server 104 is configured to communicate with user mobile phones 110 and various other components of the system 102 and the server preferably executes the main processes of the system 102. The system 102 preferably also includes a reports and inquiries database 202 configured to store reports of incidents as well as records of prior user inquiries.

The system 102 can also include an incident database 204 configured to track individual incidents that have been identified. This incident database 204 is preferably maintained in addition to or instead of the reports database 202. The incidents recorded in the incident database are preferably indicative of actual or confirmed incidents as opposed to the reports in the reports database, which may not have been confirmed, and which may include multiple reports for any single incident. The incident database can be populated using many automated and/or manual techniques. In one technique, a representative from a "911" emergency call center can enter a record of an incident into the incident database. A representative of a weather service can manually enter a record relating to a critical atmospheric event—such as a tornado or thunderstorm. In another technique, reports of incidents by users of the system can be analyzed and/or processed to identify individual incidents, which can then be entered into the incident database. This analysis or processing can be performed by human or automatically and it preferably takes into consideration whether two or more reports of an incident relate to the same actual incident. In another technique, all reports of incidents of certain types (e.g. rape, robbery, tornado) are entered into the incident database. Preferably, a time and geographic location are logged for each incident. Incidents in the incident database are preferably removed or closed after the passage of time or after the receipt of some indication that the incident has been resolved or no longer exists.

The system 102 preferably includes a user profile database 206 configured to store user preferences. The alert system 102 preferably also hosts a web site 208 that allows users to set their preferences in the user profile database 206. User preferences can include information upon which a user's zone of interest can be based, such as: a radius of distance from the user for identifying incidents of interest; a time window prior to a current time for identifying incidents of interest; a listing of incident types of interest; and a listing of incident types that are not of interest to the user. These preferences can be specified in detail for each of multiple types of incidents. The preferences can include the user's profession or area of expertise, which can enable the system to identify relevant users for responding to certain emergencies. For example, a doctor or an emergency medical technician could be selected from available users to respond to a critical health condition. In one embodiment, a user can express his area of expertise for assisting in an emergency implicitly by setting his preferences so that he is notified only of emergencies that are relevant to his area of expertise. In order to identify users to assist in emergencies, the system and/or users preferably set zones of interest to include only emergency types for which users are willing and able to assist.

The user profile database 206 is preferably configured to store an association between each user and his mobile device. Alternatively, the user profile database 206 can be configured to store preferences in association with individual mobile devices. As will be understood by one skilled in the art, for the purpose of this description, the concept of a user and of a user's mobile device can be used interchangeably.

In accordance with one embodiment, the system can also be configured to store a history of each user's location in a user position database 212. This history can be used, for example, to predict a user's location between inquiries or to predict a user's velocity and direction of travel. A user's last location or a predicted location can be used in the case that an urgent request for assistance needs to be sent to users in a certain geographic area without having to wait for users' next inquiries. In an alternative embodiment, the position history can be stored in the user profile database 206, in which case, the user profile database can serve a dual purpose as a position database.

In one embodiment, the system includes an incident evaluation module 210 configured to identify incidents and/or determine specific needs for assistance by users in response to reported emergencies or requests for assistance. Preferably, the incident evaluation module populates and/or updates the incident database 210 with information about identified incidents. The incident evaluation module can execute an automated process that determines assistance needs, preferably by emergency type, or it can be a partly or wholly manual operation. Preferably, the incident evaluation module 210 tracks which and/or how many users have responded to a request for assistance indicating that they will assist so that only a sufficient number of users actually respond to the emergency. Once a sufficient number of indications are received, the system can discontinue sending further emergency reports and/or requests for assistance.

In one embodiment, the incident evaluation module 210 compiles all reported information about each incident and attempts to determine what services and resources are needed to address it. As part of its function, the incident evaluation module 210 can analyze and identify the various independent reports the alert system 102 may receive about the same emergency or hazard. This analysis can rely upon the reported location of the incident, the time-stamp of the report, the type of emergency or hazard, and any additional information that might be provided by each reporting user, such as pictures and messages, to determine if any two reports relate to the same incident. Using this information, the incident evaluation module 210 preferably updates the incident database 204 to reflect the various incident reports submitted by different users as part of the same incident record. In addition, the incident evaluation module 210 can update current the state of resolution of each incident while actions are undertaken to address it.

II. Incident Report Handling Process

Figure 3:
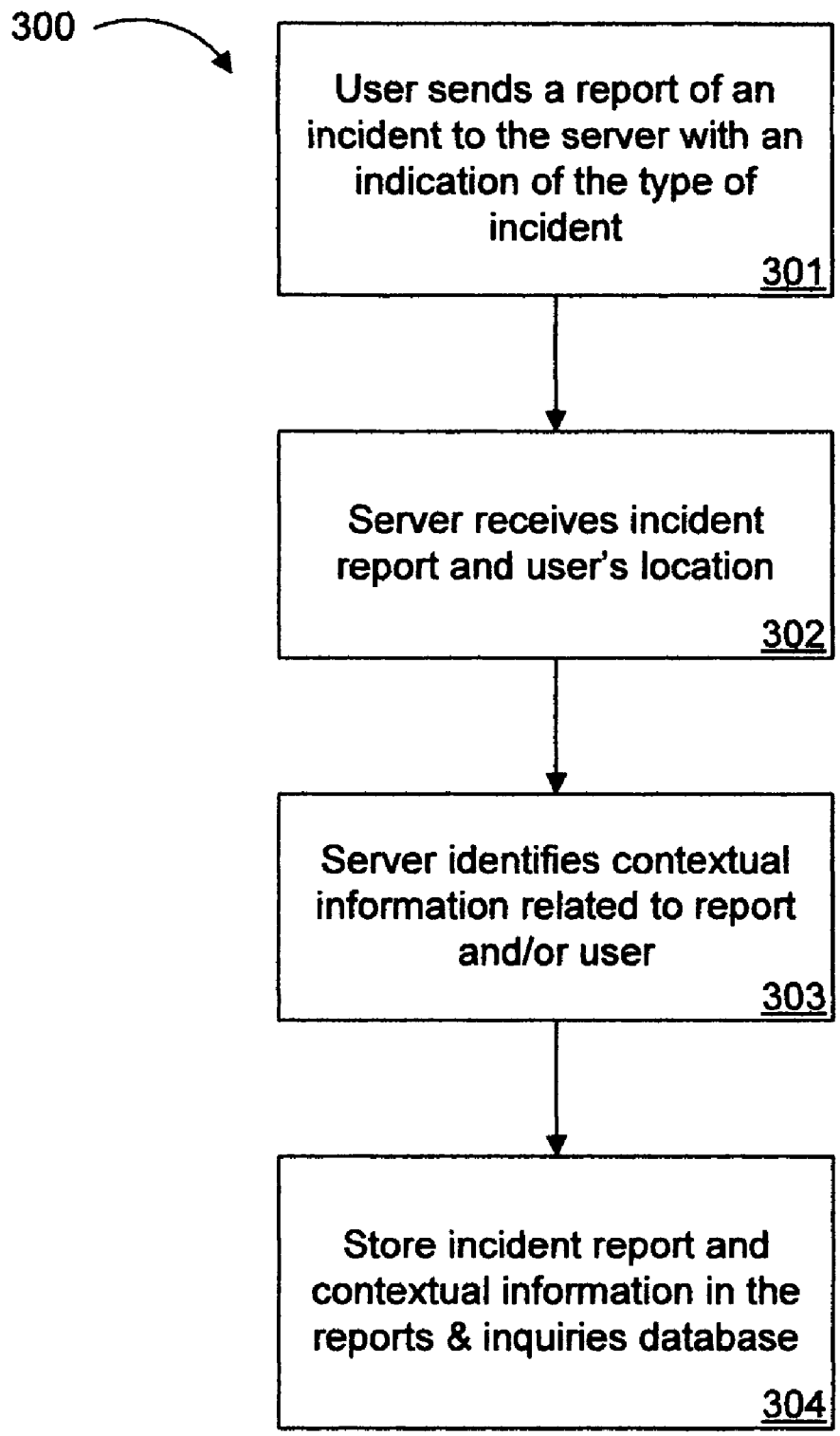
FIG. 3 illustrates one process by which an incident report can be handled by the system.

FIG. 3 illustrates one process 300 by which an incident report can be handled by the system 102. At a step 301, the user transmits a report of an incident to the server 104 from a mobile phone 110. Preferably, the user identifies a type of incident to report from a menu of available types. In one embodiment, a multilevel menu system can be used to guide the user to a selection which identifies the type of emergency or hazard the user needs to report. The available types of incidents can include, for example, general types such as: traffic hazard; weather condition; emergency; and request for assistance. The types can also include, for example, specific types such as: traffic accident; icy roads; tornado; thunderstorm; and heart attack.

Preferably, the user's mobile phone 110 adds the user's present geographic location to the report. Alternatively, a communications system that supports the mobile phone's connectivity can provide the geographic location.

Optionally, the alert system can support a voice report via the user's mobile phone. Under this option, the alert system can prompt the user to verbally describe on the mobile phone the observed emergency or hazard. This verbal description can be translated into text by a speech recognition engine. A natural language understanding software program, or alternatively a human operator, can interpret the text or voice message to identify the type of emergency or hazard.

At a step 302, the server 104 receives the report of the incident and the user's location. At a step 303, the server 104 preferably determines additional contextual information related to the report and/or user, such as, for example: the time of the report, the user's direction/speed of travel, and the user's identity/user ID. In one embodiment, this additional contextual information can be determined and provided by the user and/or the user's mobile phone. At a step 304 the incident report and the contextual information are stored in the reports and inquiries database 202.

III. Report-Based Alert Process

Figure 4:
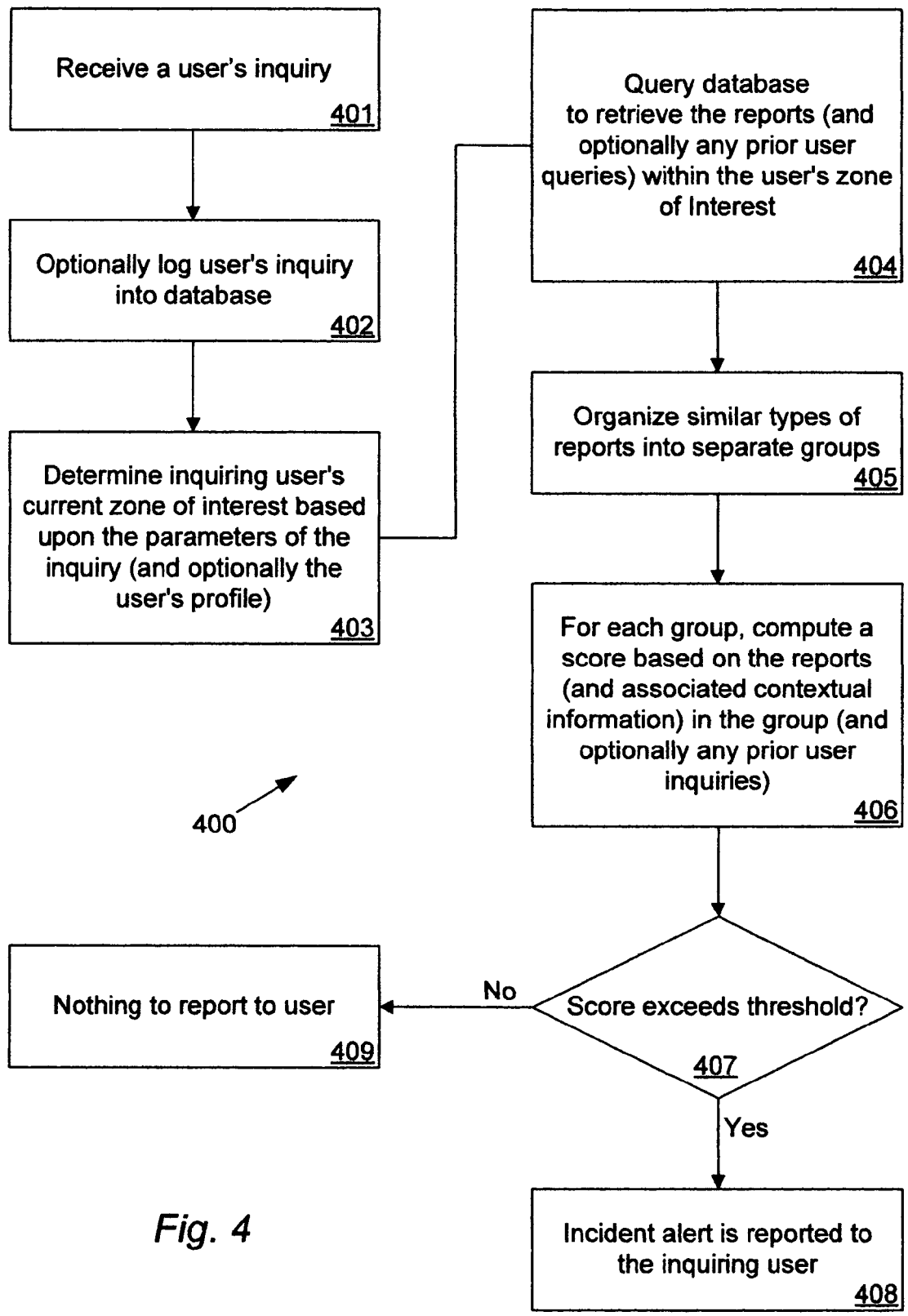
FIG. 4 illustrates a process for responding to a user's inquiry about reports of incidents within the user's zone of interest.

FIG. 4 illustrates a process 400 by which the system 102 can respond to a user's inquiry about reports of incidents within the user's zone of interest. The process 400 queries the reports and inquiries database 202 in response to the user's inquiry to retrieve reports of potential interest to the user. The reports are then analyzed to determine a score indicative of a likelihood of existence of an actual incident. If a score meets a certain threshold level, then the user can be notified of a possible or likely incident.

Preferably, the process 400 is performed repeatedly, on a periodic basis, such as every 15 seconds or every minute in response to repeated user inquiries. In this manner, recently received reports can be considered in responding to the user's inquiry. The frequency of repetition can remain constant, for example, based on a user preference/selection or based on system-optimized settings. Alternatively the frequency of repetition can be dynamically varied, and preferably initiated by inquiries from the user's mobile phone, based on one or more factors, such as, for example, the velocity of the user or the frequency or density of inquiries by other users proximate the inquiring user.

At a step 401, the alert system 102, receives a user's inquiry, which preferably includes the user's geographic location. The user's inquiry may also include additional parameters, such as, for example: user velocity and direction of travel. These additional parameters can alternatively be determined by the system, for example, by analyzing prior queries/reports from the user. In one embodiment, the inquiry can consist only of a reporting of the user's position, which the system can treat as an implied inquiry.

At a step 402, the user's inquiry is optionally logged into the reports and inquiries database 202. Logging the inquiry into the reports and inquiries database 202 enables additional data about the user to be determined for future inquiries (e.g. velocity and direction of travel). In addition, logging user inquiries also enables the system to make subsequent determinations of overall user inquiry frequency and density based on the logs of multiple users' inquiries. In one embodiment, the position of the user is also logged in the user position database 212. This information can be useful to calculate the direction and speed of movement of the user and provides information based upon which the future location of the user can be predicted.

At a step 403, the inquiring user's zone of interest is determined or identified, preferably in the form of query parameters that can be used to query the reports and inquiries database 202. The user's zone of interest, as discussed above, can be static or can be dynamically determined preferably based on parameters of the user's inquiry. The zone of interest can be based upon information provided by the user (which may be stored in the profiles database 206), information determined from the user's context (location, velocity, time), or other information.

In one embodiment, as stated previously, the user's zone of interest can be expanded or contracted in inverse proportion to the overall density or frequency of user queries proximate the user's location. Alternatively the user's zone of interest can be dynamically adjusted so that it includes a relatively constant number of inquiries by other users. By adjusting the zone of interest in this manner, the number of other users from which reports are effectively monitored remains relatively constant.

At a step 404, the reports and inquiries database 202 is queried, using the zone of interest parameters, to retrieve emergency and hazard reports and optionally any prior user inquiries within the user's zone of interest. Preferably, the inquiring user's own reports and inquiries are excluded from the results of the query, so that the user's own reports do not factor into his own subsequent inquiries.

In accordance with one embodiment, the user's zone of interest can be generic to all types of incidents. The following step 405 is intended to handle an embodiment where one zone of interest is applied to all types of incidents and then the resulting reports are grouped by type and analyzed.

At the step 405, the reports produced by the query are organized by type into separate groups. Preferably, the groups correspond to the different types of reports supported by the selection menu from which users can select the desired type when reporting incidents. In this manner, separate types of reports can be analyzed separately. The remaining steps of this process, 406 through 409, are preferably executed for each separate group of reports.

In another embodiment, a user's zone of interest can be specified separately for each type of incident. In this case, the prior step 405 can be skipped, but the whole process 400 is preferably performed for each type of incident in response to each user inquiry.

At a step 406, for each group or type of incident, a score is computed based on the reports in the group, any associated contextual information provided by the user, and optionally on any prior user inquiries retrieved from the reports and inquiries database 202. The score is preferably configured to be indicative of the likelihood that an actual incident of interest to the user has an active status. Many different calculations can yield such a score as illustrated in the following examples:

$$\text{score} = \text{overall number of reports}$$

$$\text{score} = \frac{\text{number of reports}}{\text{number of inquiries}}$$

In one embodiment, the computation of the score can be based on individual characteristics of each report in the group. For example, the score can be based on the amount of time elapsed between the current time and the time of each report in the group. The score can also be based on the distance between the inquiring user and the reporting user for each report. In this manner, reports that occurred further in the past or farther away from the inquiring user can be given decreased weight or emphasis and reports occurring closer in time or distance can be given greater emphasis. One formula could include a factor in a denominator based on a sum of differences of distance and time.

At a step 407, the computed score is analyzed to determine if it exceeds a threshold level. If the score exceeds the threshold, an incident alert is reported to the inquiring user at a step 408. The threshold level can be selected or adjusted by the user (e.g. through the web site 208 or through the phone 110), by the system, or by a combination of both, preferably based on testing and/or experience for a particular implementation of the system. Different threshold levels can also be selected for each type of incident.

The alert sent to the inquiring user preferably includes the type of incident that caused the alert. In addition, the alert can include the score itself or a value based on the score. The receiving user's mobile device is preferably configured to produce a perceptible signal (e.g. audible, visual, or vibration) in response to the alert to notify the user. The signal produced by the mobile phone can be varied based on the score, for example, so that higher scores produce more notable signals.

If, at the step 407, the score does not exceed the threshold, the process continues with step 409, in which case the inquiry is ignored and/or no incident alert is reported to the inquiring user.

IV. Emergency Identification and Handling Process

Figure 5:
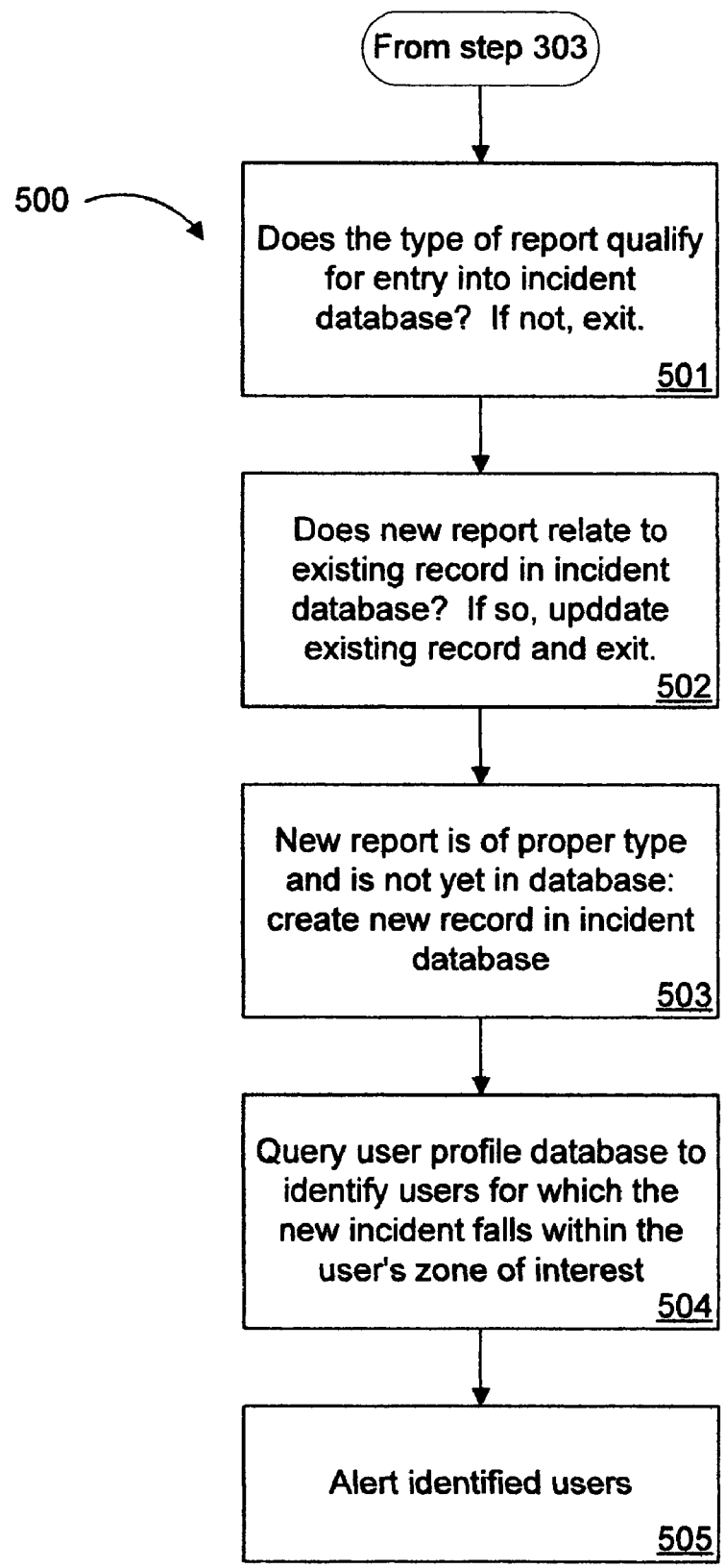
FIG. 5 illustrates a process for populating an incident database based on incident reports received from users.

FIG. 5 illustrates a process 500 for populating the incident database 204 based on incident reports received from users. The process 500 preferably follows step 303 of the process 300 and can be performed in addition to or instead of step 304 depending on whether an incident database 204 is used. At an optional step 501 the incident report is analyzed to determine whether it is a type of incident that is to be entered into the incident database 204. In one embodiment, only emergencies or critical hazards are entered. At an optional step 502, the report is checked against existing incidents already in the incident database 204 to determine if the report relates to a previously identified incident. Whether a new report is for the same incident as a prior report can be based on factors such as proximity of location, proximity of time of report, and type of incident, for example. If the new report is a duplicate of an existing one, then the existing record in the database 204 can be updated. Otherwise, at a step 503, a new record is created in the incident database for the reported incident.

Once a new emergency or hazard is identified at the step 503, the system can query the user position database 212 to identify users who may want to be informed of the incident and/or who may be able to assist in an emergency at a step 504. In this manner, in time-critical situations, the system can communicate a message (e.g. by text message or telephone call) to the mobile phone of a user independently of the user submitting an inquiry. In performing the query, the system can identify an actual or estimated position of each identified user based on the user's position history in the user position database 212. The system can also identify a geographic area associated with the incident so that any users whose estimated positions fall within the area are included in the query results.

In one embodiment, the zone of interest of each identified user, based on the user's actual or estimated position, is applied to the newly identified incident. When the incident falls within a user's zone of interest, the user can be alerted at a step 505. In one embodiment, the database query can be configured to identify incidents where the geographic coverage of the incident intersects with the geographic scope of the inquiring user's zone of interest.

An alert of an emergency that is sent to a user can also be accompanied by a request that the receiving user assist in the emergency. In this case, the user receiving the emergency alert can be given the opportunity respond to the system indicating that he will assist.

A user's preferences can be set to indicate that the user will only be willing to travel a certain distance to respond to an emergency. In this case, the user's zone of interest for a type of emergency can be configured to include only emergencies located within the specified distance of the user's actual or predicted location.

V. Incident-Based Alert Process

Figure 6:
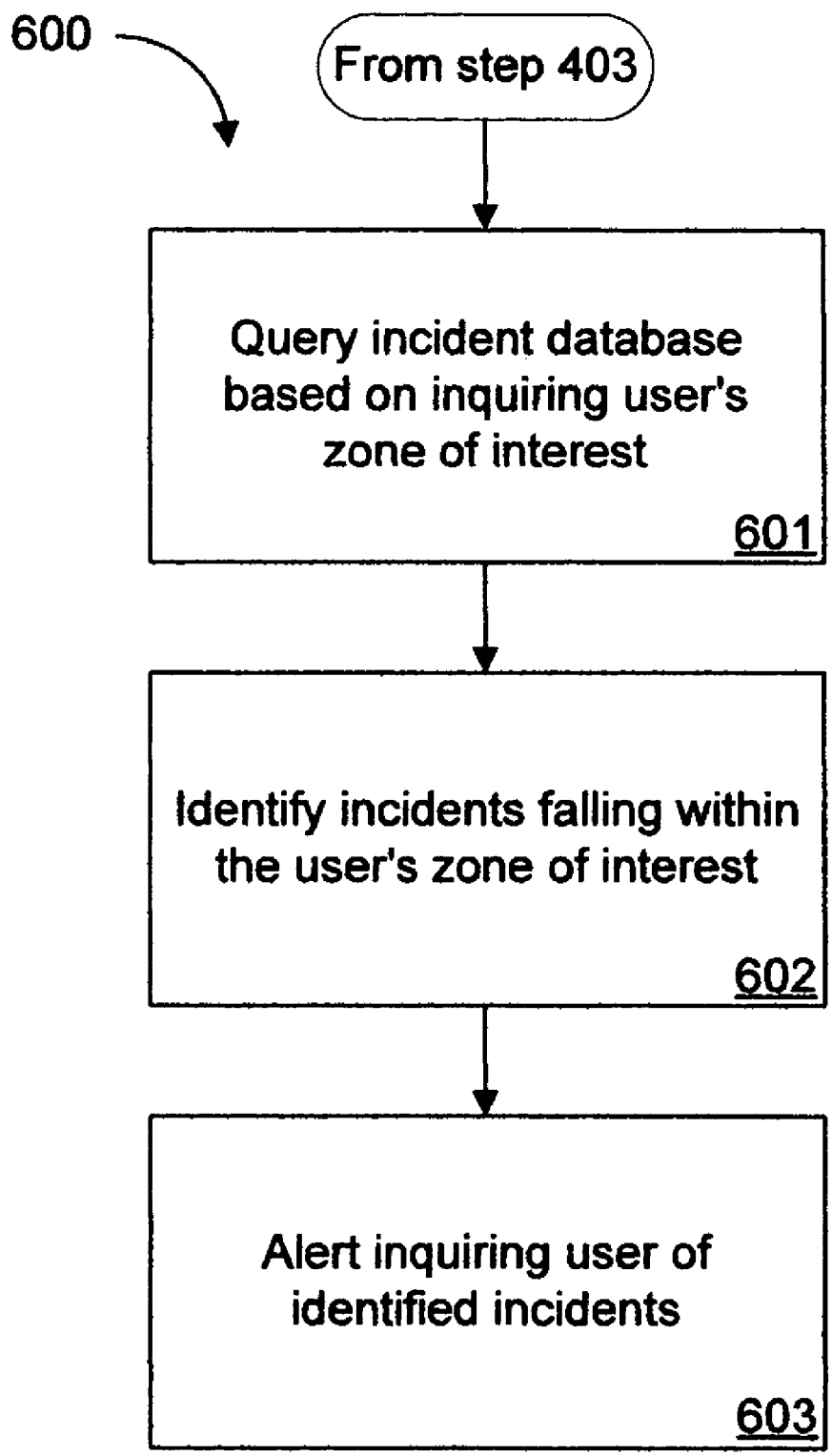
FIG. 6 illustrates a process for querying the incident database in response to a user inquiry.

FIG. 6 illustrates a process 600 for querying the incident database in response to a user inquiry. The process 600 preferably follows step 403 of the process 400 and can be performed in addition to or instead of steps 404-409 of the process 400 depending on whether an incident database 204 is used. When a user submits an inquiry, the incident database is queried, at a step 601, using the user's zone of interest in the same manner as described above with respect to the reports database in the process 400. At a step 602, the system 102 identifies incidents that fall within the user's zone of interest (e.g. based on time and geographic location of the incident). At a step 603, the identified incidents are reported to the inquiring user.

In accordance with one embodiment, certain types of incidents (e.g. hurricanes, thunderstorms, tsunamis) can be entered into the incident database 204 to cover or define a geographic area (and/or a time period), rather than just a point. To account for these cases, the database query can be configured to further identify incidents where the geographic coverage of the incident intersects with the geographic scope of the inquiring user's zone of interest.

VI. Conclusion

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow.

What is claimed is:

1. A method for sending alerts of incidents based on geographic position and time, the method comprising:
    receiving reports of incidents reported by users through a plurality of networked mobile devices;
    storing an indication of each report in a database in association with a geographic position and a time;
    receiving an inquiry transmitted automatically, as one of a sequence of periodic inquiries, by a networked mobile device of an inquiring user;
    identifying a geographic position associated with the inquiry;
    identifying a geographic range related to the identified geographic position;
    identifying a temporal range related to a present time;
    querying the database based on the temporal range and the geographic range to obtain a results set of reports;
    calculating a score based on the results set of reports; and
    in response to determining that the score exceeds a threshold, sending an alert to the inquiring user.

2. The method of claim 1, wherein each incident can be: an emergency, a hazard, or a request for assistance.

3. The method of claim 1, further comprising:
    for the received inquiry and each of a plurality of prior inquiries transmitted by and received from a plurality of a networked, mobile devices, storing an indication of the inquiry in the database in association with a geographic position and a time; and
    querying the database based on the temporal range and the geographic range to obtain a results set of inquiries,
    wherein the calculation of the score is further based on the results set of inquiries.

4. The method of claim 1, wherein the score is further based on an elapsed time between the time associated with each report in the results set of reports and the time associated with the inquiry.

5. The method of claim 1, wherein the score is further based on a distance between the geographic position of each report in the results set of reports and the geographic position associated with the inquiry.

6. The method of claim 1, wherein at least one of the received reports includes the geographic position that is stored in association with the indication of the report.

7. The method of claim 1, wherein the geographic position associated with the inquiry is automatically determined by the inquiring user's networked mobile device.

8. The method of claim 1, further comprising, identifying a direction of travel associated with the inquiry, wherein the identified geographic range is further related to the identified direction of travel.

9. The method of claim 1, further comprising, identifying a direction of travel associated with the inquiry, wherein the indication of each report is stored in the database further in association with a direction of travel, and wherein the database is queried further based on the identified direction of travel.

10. The method of claim 1, further comprising, identifying a velocity associated with the inquiry, wherein the identified geographic range is further related to the identified velocity.

11. The method of claim 1, further comprising, identifying a velocity associated with the inquiry, wherein the indication of each report is stored in the database further in association with a velocity, and wherein the database is queried further based on the identified velocity.

12. A non-transitory computer readable medium for sending alerts of incidents based on geographic position and time, the computer readable medium containing instructions which, when executed by a computer system, cause the computer system to perform the functions of:
    receiving reports of incidents reported by users through a plurality of networked mobile devices;
    storing an indication of each report in a database in association with a geographic position and a time;
    receiving an inquiry transmitted automatically, as one of a sequence of periodic inquiries, by a networked mobile device of an inquiring user;
    identifying a geographic position associated with the inquiry;

identifying a geographic range related to the identified geographic position;
identifying a temporal range related to a present time;
querying the database based on the temporal range and the geographic range to obtain a results set of reports;
calculating a score based on the results set of reports; and
in response to determining that the score exceeds a threshold, sending an alert to the inquiring user.

13. The computer readable medium of claim 12, wherein each incident can be: an emergency, a hazard, or a request for assistance.

14. The computer readable medium of claim 12, wherein the instructions cause the computer system to perform the further functions of:
for the received inquiry and each of a plurality of prior inquiries transmitted by and received from a plurality of a networked mobile devices, storing an indication of the inquiry in the database in association with a geographic position and a time; and
querying the database based on the temporal range and the geographic range to obtain a results set of inquiries,
wherein the calculation of the score is further based on the results set of inquiries.

15. The computer readable medium of claim 12, wherein the score is further based on an elapsed time between the time associated with each report in the results set of reports and the time associated with the inquiry.

16. The computer readable medium of claim 12, wherein the score is further based on a distance between the geographic position of each report in the results set of reports and the geographic position associated with the inquiry.

17. The computer readable medium of claim 12, wherein at least one of the received reports includes the geographic position that is stored in association with the indication of the report.

18. The computer readable medium of claim 12, wherein the geographic position associated with the inquiry is automatically determined by the inquiring user's networked mobile device.

19. The computer readable medium of claim 12, wherein the instructions cause the computer system to perform the further function of identifying a direction of travel associated with the inquiry, wherein the identified geographic range is further related to the identified direction of travel.

20. The computer readable medium of claim 12, wherein the instructions cause the computer system to perform the further function of identifying a direction of travel associated with the inquiry, wherein the indication of each report is stored in the database further in association with a direction of travel, and wherein the database is queried further based on the identified direction of travel.

21. The computer readable medium of claim 12, wherein the instructions cause the computer system to perform the further function of identifying a velocity associated with the inquiry, wherein the identified geographic range is further related to the identified velocity.

22. The computer readable medium of claim 12, wherein the instructions cause the computer system to perform the further function of identifying a velocity associated with the inquiry, wherein the indication of each report is stored in the database further in association with a velocity, and wherein the database is queried further based on the identified velocity.

23. A system for sending alerts of incidents based on geographic position and time, the system comprising a database and a server, wherein the server is configured for:
receiving reports of incidents reported by users through a plurality of networked mobile devices;
storing an indication of each report in the database in association with a geographic position and a time;
receiving an inquiry transmitted automatically, as one of a sequence of periodic inquiries, by a networked mobile device of an inquiring user;
identifying a geographic position associated with the inquiry;
identifying a geographic range related to the identified geographic position;
identifying a temporal range related to a present time;
querying the database based on the temporal range and the geographic range to obtain a results set of reports;
calculating a score based on the results set of reports; and
in response to determining that the score exceeds a threshold, sending an alert to the inquiring user.

24. The system of claim 23, wherein each incident can be: an emergency, a hazard, or a request for assistance.

25. The system of claim 23, wherein the server is further configured for:
for the received inquiry and each of a plurality of prior inquiries transmitted by and received from a plurality of a networked mobile devices, storing an indication of the inquiry in the database in association with a geographic position and a time; and
querying the database based on the temporal range and the geographic range to obtain a results set of inquiries,
wherein the calculation of the score is further based on the results set of inquiries.

26. The system of claim 23, wherein the score is further based on an elapsed time between the time associated with each report in the results set of reports and the time associated with the inquiry.

27. The system of claim 23, wherein the score is further based on a distance between the geographic position of each report in the results set of reports and the geographic position associated with the inquiry.

28. The system of claim 23, wherein at least one of the received reports includes the geographic position that is stored in association with the indication of the report.

29. The system of claim 23, wherein the geographic position associated with the inquiry is automatically determined by the inquiring user's networked mobile device.

30. The system of claim 23, wherein the server is further configured for identifying a direction of travel associated with the inquiry, wherein the identified geographic range is further related to the identified direction of travel.

31. The system of claim 23, wherein the server is further configured for identifying a direction of travel associated with the inquiry, wherein the indication of each report is stored in the database further in association with a direction of travel, and wherein the database is queried further based on the identified direction of travel.

32. The system of claim 23, wherein the server is further configured for identifying a velocity associated with the inquiry, wherein the identified geographic range is further related to the identified velocity.

33. The system of claim 23, wherein the server is further configured for identifying a velocity associated with the inquiry, wherein the indication of each report is stored in the database further in association with a velocity, and wherein the database is queried further based on the identified velocity.

* * * * *